US010628625B2

(12) United States Patent
Geist et al.

(10) Patent No.: US 10,628,625 B2
(45) Date of Patent: Apr. 21, 2020

(54) INCREMENTALLY DISTRIBUTING LOGICAL WIRES ONTO PHYSICAL SOCKETS BY REDUCING CRITICAL PATH DELAY

(71) Applicant: Synopsys, Inc., Mountain View, CA (US)

(72) Inventors: Daniel Geist, Haifa (IL); Dmitriy Mosheyev, Zichron Yaakov (IL); Richard Yachyang Sun, Los Gatos, CA (US); Yoon Kah Leow, Singapore (SG)

(73) Assignee: SYNOPSYS, INC., Mountain View, CA (US)

( * ) Notice: Subject to any disclaimer, the term of this patent is extended or adjusted under 35 U.S.C. 154(b) by 116 days.

(21) Appl. No.: 15/477,390

(22) Filed: Apr. 3, 2017

(65) Prior Publication Data

US 2017/0293708 A1    Oct. 12, 2017

Related U.S. Application Data

(60) Provisional application No. 62/335,869, filed on May 13, 2016, provisional application No. 62/320,299, filed on Apr. 8, 2016.

(51) Int. Cl.
*G06F 17/50* (2006.01)
*G06F 30/394* (2020.01)
(Continued)

(52) U.S. Cl.
CPC ........ *G06F 30/394* (2020.01); *G06F 30/3323* (2020.01); *G06F 30/34* (2020.01); *G06F 30/3312* (2020.01); *G06F 2119/12* (2020.01)

(58) Field of Classification Search
CPC ............ G06F 17/5077; G06F 17/5054; G06F 17/504; G06F 2217/84; G06F 17/5031; G06F 17/5027
See application file for complete search history.

(56) References Cited

U.S. PATENT DOCUMENTS 5,999,715 A    12/1999 Sato
6,473,885 B1 *  10/2002 Wallace ................ G06F 17/505
                                                    716/107

(Continued)

OTHER PUBLICATIONS

U.S. Appl. No. 62/320,299, filed Apr. 8, 2016, Expired.

(Continued)

*Primary Examiner* — Nha T Nguyen
(74) *Attorney, Agent, or Firm* — Alston & Bird LLP

(57) ABSTRACT

Configuring a hardware system includes providing a first data representative of a first assignment of a multitude of wires to a multitude of physical connections between a multitude of logic circuits of the hardware system, and transforming the first data into a second data representative of a second assignment of the multitude of wires to the multitude of physical connections. The transforming includes calculating a multitude of latencies each associated with a selected one of the multitude of wires, and assigning a first subset of the multitude of wires to at least one of the multitude of physical connections in accordance with a first improvement goal. The transforming causes the value of each one of the multitude of latencies that are associated with the first subset to be less than or equal to the first improvement goal, when the second data is used to configure the hardware system.

27 Claims, 7 Drawing Sheets

(51) Int. Cl.
  *G06F 30/34* (2020.01)
  *G06F 30/3323* (2020.01)
  *G06F 30/3312* (2020.01)
  *G06F 119/12* (2020.01)

(56) References Cited

U.S. PATENT DOCUMENTS

| | | | |
|---|---|---|---|
| 6,721,930 B2 | 4/2004 | Sasaki et al. | |
| 6,886,152 B1* | 4/2005 | Kong | G06F 17/5054 716/128 |
| 7,237,214 B1* | 6/2007 | Pandey | G06F 17/5072 716/131 |
| 7,424,697 B1* | 9/2008 | Arslan | G06F 17/5031 716/116 |
| 8,024,695 B2 | 9/2011 | Reis et al. | |
| 8,196,082 B1* | 6/2012 | Kannan | G06F 17/5077 716/113 |
| 8,225,254 B2 | 7/2012 | Sugiyama | |
| 8,988,125 B1* | 3/2015 | Ganusov | H03K 5/14 327/261 |
| 9,646,126 B1* | 5/2017 | Lu | G06F 17/5068 |
| 2006/0074622 A1* | 4/2006 | Scott | G06F 11/3636 703/23 |
| 2008/0082951 A1* | 4/2008 | Hu | G06F 17/5054 716/113 |
| 2008/0216038 A1* | 9/2008 | Bose | G06F 17/5072 716/118 |
| 2008/0238476 A1* | 10/2008 | Lewis | G06F 17/5054 326/40 |
| 2010/0218157 A1* | 8/2010 | McMurchie | G06F 17/5054 716/129 |
| 2011/0145780 A1* | 6/2011 | Chen | G06F 17/5054 716/137 |
| 2011/0307233 A1* | 12/2011 | Tseng | G06F 17/5022 703/14 |
| 2014/0136177 A1* | 5/2014 | Lee | G06F 17/5054 703/14 |
| 2014/0351556 A1* | 11/2014 | Fawaz | G06F 15/80 712/15 |
| 2015/0186561 A1* | 7/2015 | Teig | G06F 17/505 716/134 |
| 2015/0227662 A1* | 8/2015 | Lepercq | G06F 17/5054 716/117 |
| 2015/0248512 A1* | 9/2015 | Shen | G06F 17/5054 716/113 |
| 2016/0301414 A1* | 10/2016 | Olbrich | G06F 17/5054 |
| 2017/0351795 A1* | 12/2017 | Ghattas | G06F 17/5022 |
| 2017/0364621 A1* | 12/2017 | Lepercq | G06F 17/5036 |
| 2018/0101624 A1* | 4/2018 | Dhar | G06F 17/5031 |
| 2018/0121573 A1* | 5/2018 | Chou | G06F 17/504 |

OTHER PUBLICATIONS

U.S. Appl. No. 62/335,869, filed May 13, 2016, Pending.
PCT/US2017/025985, filed Apr. 4, 2017, Pending.
WIPO Application No. PCT/US2017/025985, PCT International Preliminary Report on Patentability dated Oct. 18, 2018.
WIPO Application No. PCT/US2017/025985, PCT International Search Report and Written Opinion of the International Searching Authority dated Jun. 21, 2017.
Huang, et al., "Logic and circuit simulation," Electronic Design Automation—Synthesis, Verification, and Test, Chapter 8, pp. 449-512, Jan. 1, 2009.
Inagi, et al., Inter-FPGA Routing for Partially Time-Multiplexing Inter-FPGA Signals on Multi-FPGA Systems with Various Topologies, IEICE Trans Fundamentals, vol. E98-A, No. 12, pp. 2572-2583, Dec. 2015.
Kwon, et al., "SCATOMi : Scheduling Driven Circuit Partitioning Algorithm for Multiple FPGAs using Time-multiplexed, Off-chip, Multicasting Interconnection Architecture," Proceedings of the 21st International Conference on Computer Design (ICCD'03), 1063-6404/03, IEEE (2003).
EP 17779680.2 Extended European Search Report dated Nov. 18, 2019.

* cited by examiner

INCREMENTALLY DISTRIBUTING LOGICAL WIRES ONTO PHYSICAL SOCKETS BY REDUCING CRITICAL PATH DELAY

CROSS-REFERENCES TO RELATED APPLICATIONS

This application claims priority, under 35 U.S.C. § 119(e), from U.S. Provisional Application No. 62/320,299, filed on Apr. 8, 2016, entitled "INCREMENTAL ALGORITHM FOR DISTRIBUTING LOGICAL WIRES ONTO PHYSICAL SOCKETS BY REDUCING THE DELAY ON CRITICAL PATHS", and from U.S. Provisional Application No. 62/335,869, filed on May 13, 2016, entitled "INCREMENTALLY DISTRIBUTING LOGICAL WIRES ONTO PHYSICAL SOCKETS BY REDUCING CRITICAL PATH DELAY", the contents of all of which are incorporated herein by reference in their entirety.

BACKGROUND

The present disclosure relates generally to testing a circuit design, and more specifically to testing a circuit design using a programmable emulation tool having improved performance.

Verification of Very Large Scale Integrated (VLSI) circuits is important to the success of any modern VLSI product. Verification typically involves running a large number of tests on the circuit by simulating the circuit on a state-of-the-art computer system. In the past decade, it has often become intractable to conduct such tests on general purpose computing equipment for reasons of poor performance and capacity. Some VLSI manufacturers have shifted to running tests on specialized Configurable Hardware Logic (CHL). This method is called hardware emulation, hereinafter also referred to as emulation.

In emulation, the VLSI design is mapped into a set or multitude of CHLs, which together exhibit the behavior of the mapped circuit design. The CHLs may be Field Programmable Logic Arrays (FPGAs), for example. Emulation presents several challenges:

1. Splitting the design onto the CHLs, hereinafter also referred to as "partitioning".
2. Routing wires from one part of the design that is mapped on one CHL, e.g. CHL A, to another part of the design that is mapped on a different CHL, e.g. CHL B, hereinafter also referred to as "routing". This may involve several hops across other intermediate CHLs, e.g. not CHL A or B, because of physical connectivity constraints; not all CHL pairs, e.g. CHL A, B, may be directly connected to one another.
3. Assigning specific design wires to specific physical CHL communication ports (called sockets), hereinafter also referred to as the "pin assignment".

A complication of pin assignment is that more than one wire may map onto the same socket because the number of physical sockets is typically smaller than the number of wires to be assigned. One solution to this problem utilizes time division multiplexing (TDM) hereinafter also referred to as "multiplexing". TDM divides a larger time unit (e.g., 1 second) into multiple smaller time units (e.g., $\frac{1}{100}$ of a second). At each small time unit data is transmitted for a different virtual wire. The wires assigned to the TDM time slots are hereinafter also referred to as "virtual wires". The sender and receiver circuits of signals on virtual wires coordinate to associate virtual wires with TDM time slots.

Thus pin assignment presents a twofold challenge: assigning the wires to sockets, and forming a time multiplexing hardware infrastructure in the programmable devices, e.g. the set of FPGAs. The time multiplexing may be implemented by a set of mapped multiplexer circuits. The challenges of wire assignment to sockets and wire assignment to TDM time slots are coupled, because addressing the second challenge introduces further constraints on the possible assignments available to address the first challenge and directly affects emulator speed because the number of sockets is constrained by the hardware. Therefore, there is a need to assign wires to sockets such that emulator speed is improved.

SUMMARY

According to one embodiment of the present invention, a computer-implemented method for configuring a hardware system is presented. The method includes providing, in the computer, a first data representative of a first assignment of a multitude of wires to a multitude of physical connections between a multitude of logic circuits of the hardware system; and transforming, using the computer, the first data into a second data representative of a second assignment of the multitude of wires to the multitude of physical connections. The transforming includes calculating a multitude of latencies each associated with a selected one of the multitude of wires, and assigning a first subset of the multitude of wires to at least one of the multitude of physical connections in accordance with a first improvement goal. The transforming causes the value of each one of the multitude of latencies that are associated with the first subset to be less than or equal to the first improvement goal, when the second data is used to configure the hardware system.

According to one embodiment, the method further includes sorting the multitude of wires in accordance with the multitude of latencies to generate a latency sorted order. The assigning is performed in accordance with the latency sorted order. According to one embodiment, the latency sorted order is in an ascending order from a lowest latency being a first latency in the latency sorted order to a highest latency being a last latency in the latency sorted order. According to one embodiment, the latency sorted order is in a descending order from a highest latency being a first latency in the latency sorted order to a lowest latency being a last latency in the latency sorted order.

According to one embodiment, the method further includes assigning each one of an unassigned multitude of wires to a different one of a multitude of vacant connections when a number of the unassigned multitude of wires is less than or equal to a number of the multitude of vacant connections. According to one embodiment, the method further includes assigning each one of the first subset to the at least one of the multitude of physical connections until it is determined that further assigning an additional one of the multitude of wires causes the first improvement goal to be violated.

According to one embodiment, the method further includes assigning in accordance with a second improvement goal when the first improvement goal is reached. The second improvement goal is harder to reach than the first improvement goal. According to one embodiment, the method further includes assigning in accordance with a second improvement goal when the first improvement goal cannot be reached. The second improvement goal is easier to reach than the first improvement goal. According to one embodiment, the first improvement goal is calculated in accordance with at least one of the multitude of latencies.

According to one embodiment, the multitude of logic circuits is selected from the group consisting of programmable gate arrays (FPGA), and configurable hardware logic (CHL). According to one embodiment, at least one of the multitude of physical connections use time domain multiplexing (TDM).

According to one embodiment, the method further includes choosing a pair of the multitude of logic circuits, and iteratively repeating the choosing, the calculating, and the assigning in accordance with the improvement goal. According to one embodiment, the method further includes choosing a pair of the multitude of logic circuits. The pair dictates a highest frequency of the hardware system when the hardware system is configured with the first data and run. According to one embodiment, at least one of the multitude of latencies is further associated with a count of a multitude of clock signals.

According to one embodiment of the present invention, a system for configuring a hardware of the system is presented. The system is configured to provide a first data representative of a first assignment of a multitude of wires to a multitude of physical connections between a multitude of logic circuits of the hardware, and transform the first data into a second data representative of a second assignment of the multitude of wires to the multitude of physical connections. During the transformation the system is further configured to calculate a multitude of latencies each associated with a selected one of the multitude of wires, and assign a first subset of the multitude of wires to at least one of the multitude of physical connections in accordance with a first improvement goal. The transformation causes the value of each one of the multitude of latencies that are associated with the first subset to be less than or equal to the first improvement goal, when the second data is used to configure the hardware.

According to one embodiment, the system is further configured to sort the multitude of wires in accordance with the multitude of latencies to generate a latency sorted order. The system is configured to assign in accordance with the latency sorted order. According to one embodiment, the system is further configured to assign each one of an unassigned multitude of wires to a different one of a multitude of vacant connections when a number of the unassigned multitude of wires is less than or equal to a number of the multitude of vacant connections. According to one embodiment, the system is further configured to assign each one of the first subset to the at least one of the multitude of physical connections until it is determined that to further assign an additional one of the multitude of wires causes the first improvement goal to be violated.

According to one embodiment, the system is further configured to assign in accordance with a second improvement goal when the first improvement goal is reached. The second improvement goal is harder to reach than the first improvement goal. According to one embodiment, the system is further configured to assign in accordance with a second improvement goal when the first improvement goal cannot be reached. The second improvement goal is easier to reach than the first improvement goal.

According to one embodiment, the system is further configured to choose a pair of the multitude of logic circuits, and iteratively repeat the to choose, the to calculate, and the to assign in accordance with the improvement goal. According to one embodiment, the system is further configured to choose a pair of the multitude of logic circuits. The pair dictates a highest frequency of the hardware when the hardware is configured with the first data and run.

According to one embodiment of the present invention, a non-transitory computer-readable storage medium comprising instructions, which when executed by a computer, cause the computer to provide a first data representative of a first assignment of a multitude of wires to a multitude of physical connections between a multitude of logic circuits of a hardware system. The instructions further cause the computer to transform the first data into a second data representative of a second assignment of the multitude of wires to the multitude of physical connections. During the transformation the instructions further cause the computer to calculate a multitude of latencies each associated with a selected one of the multitude of wires, and assign a first subset of the multitude of wires to at least one of the multitude of physical connections in accordance with a first improvement goal. The transformation causes the value of each one of the multitude of latencies that are associated with the first subset to be less than or equal to the first improvement goal, when the second data is used to configure the hardware system.

According to one embodiment, the instructions further cause the computer to sort the multitude of wires in accordance with the multitude of latencies to generate a latency sorted order. The instructions cause the computer to assign in accordance with the latency sorted order. According to one embodiment, the instructions further cause the computer to assign each one of an unassigned multitude of wires to a different one of a multitude of vacant connections when a number of the unassigned multitude of wires is less than or equal to a number of the multitude of vacant connections. According to one embodiment, the instructions further cause the computer to assign each one of the first subset to the at least one of the multitude of physical connections until it is determined that to further assign an additional one of the multitude of wires causes the first improvement goal to be violated.

According to one embodiment, the instructions further cause the computer to assign in accordance with a second improvement goal when the first improvement goal is reached. The second improvement goal is harder to reach than the first improvement goal. According to one embodiment, the instructions further cause the computer to assign in accordance with a second improvement goal when the first improvement goal cannot be reached. The second improvement goal is easier to reach than the first improvement goal.

According to one embodiment, the instructions further cause the computer to choose a pair of the multitude of logic circuits, and iteratively repeat the to choose, the to calculate, and the to assign in accordance with the improvement goal. According to one embodiment, the instructions further cause the computer to choose a pair of the multitude of logic circuits. The pair dictates a highest frequency of the hardware system when the hardware system is configured with the first data and run.

A better understanding of the nature and advantages of the embodiments of the present invention may be gained with reference to the following detailed description and the accompanying drawings.

BRIEF DESCRIPTION OF THE DRAWINGS

To easily identify the discussion of any particular element or act, the most significant digit or digits in a reference number refer to the figure number in which that element is first introduced.

DETAILED DESCRIPTION

Figure 1:
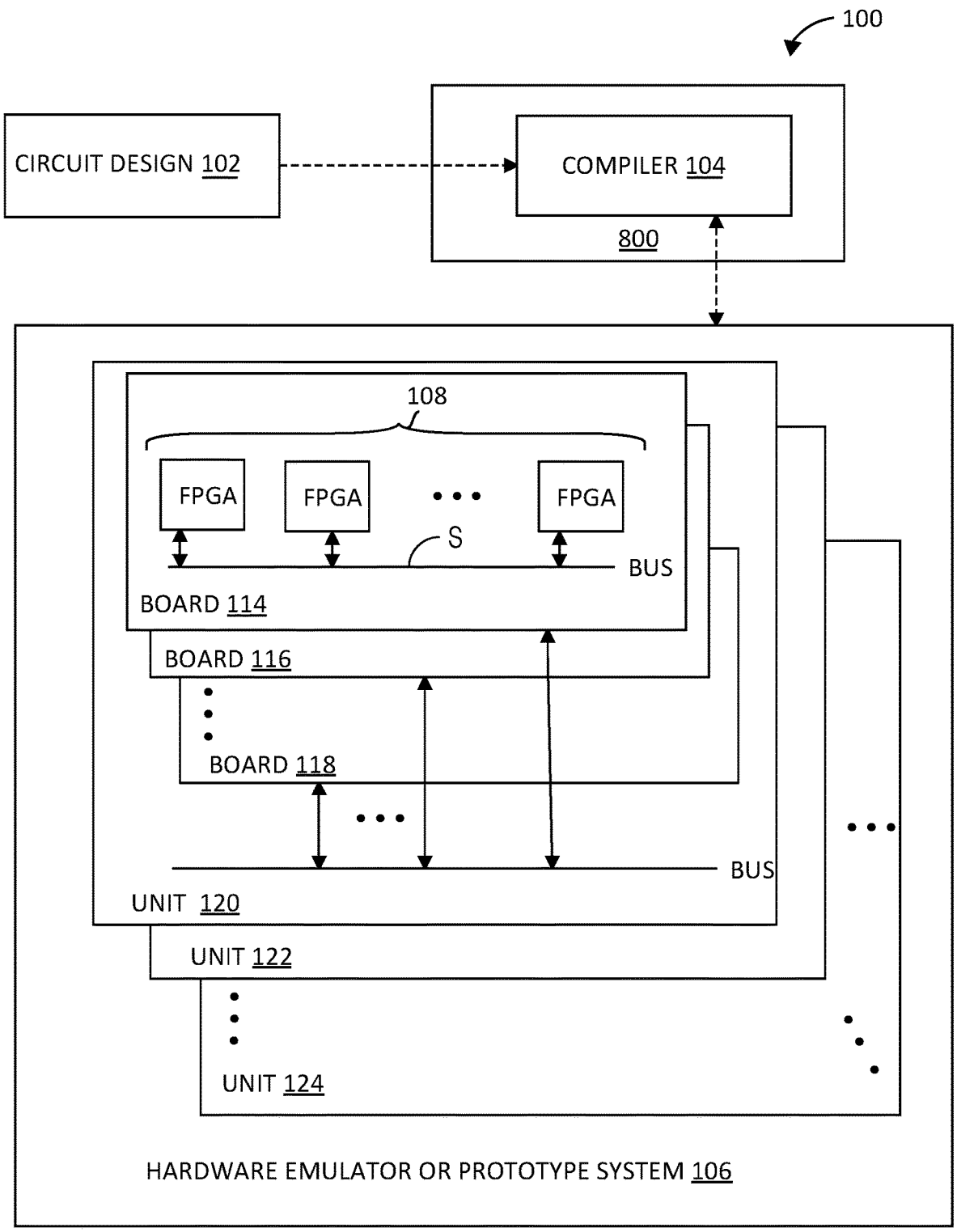
FIG. 1 depicts an exemplary high-level block diagram of a hardware system, in accordance with one embodiment of the present invention.

"CHL" in this context refers to "configurable hardware logic", electronic hardware having physical interconnections that can be re-configured over and over for particular purposes. Circuit boards including multiple FPGAs are one example of CHL.

"FPGA" in this context refers to "field programmable gate array", a type of CHL including logic blocks that can be re-wired in the field (after hardware manufacturing). An FPGA configuration is generally specified using a hardware description language (HDL). FPGAs contain an array of programmable logic blocks, and a hierarchy of reconfigurable interconnects that allow the blocks to be electrically interconnected into different configurations. Logic blocks can be interconnected to perform complex combinational functions. In many FPGAs, logic blocks also include memory elements, which may be simple flip-flops or more complex blocks of memory.

"HDL" in this context refers to "hardware description language", a specialized computer language used to describe the structure and behavior of electronic circuits. HDL enables a precise, formal description of an electronic circuit that allows for the automated analysis and simulation of an electronic circuit. It also allows for the synthesis of a HDL description into a netlist, which is a data specification representing the physical electronic components and how they are connected together), and which can then be placed and routed to define an integrated circuit.

"Net, or path" in this context refer to a connection in the netlist from one electrical component or terminal to another. The terms net, or path are used interchangeably herein. Further, it is understood that when referring to net, or path it is the computer data representing a physical conductive trace and not the physical conductive trace itself that is being described unless a physical connection is specifically called out. For example, a socket (defined below) is a physical connection that may use metal conductors such as traces, pads, or pins to electrically connect between a pair of CHLs. Further, one or more paths, represented as data in a netlist, may be mapped by software in the compiler to physical wire traces in the pair of CHLs and the socket connecting the pair of CHLs in order to conduct electrical signals when the hardware system containing the pair of CHLs is run.

"Wire" in this context refers to data representing a subset or segment of a path.

"Hop" in this context refers to a direct communication path between an immediately adjacent, hereinafter also referred to as "neighboring," CHL pair that does not pass through one or more intermediate CHLs. A select single path can be routed between an FPGA pair multiple times, e.g. back and forth, back and forth using a multitude of hops.

"LVDS" in this context refers to "low-voltage differential signaling", a technical standard that specifies electrical characteristics of a low-voltage differential serial communications protocol.

"Programmable device or programmable hardware" in this context refers to an integrated circuit designed to be configured and/or reconfigured after manufacturing. Programmable devices may include programmable processors, such as field programmable gate arrays (FPGAs) and/or any other type programmable devices. Configuration of the programmable device is specified using computer code, such as a hardware description language (HDL), for example Verilog, VHDL, or the like. A programmable device may include an array of programmable logic blocks and a hierarchy of re-configurable interconnects that enable the programmable logic blocks to be coupled to each other according to the descriptions in the HDL code. Each of the programmable logic blocks can be configured to perform complex combinational functions, or simple logic gates, such as for example AND and XOR logic blocks. In most FPGAs, logic blocks also include memory elements, which may be simple latches, flip-flops, i.e. "flops," or more complex blocks of memory. Depending on the length of the interconnections or the data representing their associated paths between different logic blocks, signals may arrive at input terminals of the logic blocks at different times. Hardware emulation and/or prototyping systems may utilize one or more programmable devices.

"Slack" in this context refers to the difference between an allocated completion time for a signal, and the required time for completion of the signal provided in a circuit design for a signal to complete (an inverse of the circuit design clock frequency). It is often the case in simulation of a circuit design that signals are allocated more time than they require to reach their destination over an assigned path. The difference between the allocated time of a signal and its required time is called its slack. Accordingly, critical paths may have less or zero slack compared to non-critical paths that have more slack than critical paths.

"Socket" in this context refers to a physical electrical connection or communication port on a pair of CHL. A socket may include communication and control circuitry on each of the CHL in the pair that are connected by a physical wire in the hardware system. When data representing a wire is assigned to a socket, then the path associated with that wire is implicitly assigned the same socket since the wire is a segment of the associated path.

"TDM" in this context refers to allocating the data representing or the physical utilization of a wiring or circuit resource into different distinct time slots.

"Virtual wire" in this context refers to a utilization of a physical communication path segment (wire) during a distinct TDM time slot. For example, three "virtual wires" are created when a socket or single physical wire between a CHL pair is utilized during three distinct TDM time slots.

"VLSI" in this context refers to "very large scale integration", a single circuit chip package including, typically, hundreds of thousands, millions, or even billions of individual circuits.

"XDR value" in this context refers to a number of virtual wires assigned to a socket.

Embodiments of the present invention describe a system and process to address pin assignment in the emulation of circuit designs. Given a set of physical socket connections and a multitude of wires with different delay priorities, the system and processes involve assigning wires to available sockets in an advantageous manner. In the disclosed embodiments, an improvement goal is determined, iterative determination is performed for assignment to improve on previous assignment, and the wires associated with the least critical paths, hereinafter also referred to as "least critical wires," are assigned first. Although this is counterintuitive, a result of this approach is that the least critical wires are "stuffed" to a reduced (ideally, minimal) number of sockets, leaving as many as possible empty sockets for wires associated with the more critical paths, hereinafter also referred to as "more critical wires," to be assigned after the less critical wires have been assigned.

Briefly, a pin assignment software module first assigns less critical wires to sockets of the CHL pairs, leaving more empty or lightly loaded sockets for later assignment of critical path wires.

More specifically, given a CHL pair and an improvement goal, embodiments of a software module are disclosed that:
1. First disconnects all the virtual wires connecting the two CHLs of the CHL pair.
2. Begins reassigning virtual wires to sockets of the CHL pair, trying to first "stuff" the wires with the highest slack, e.g. less critical wires, to the least possible number of sockets, while respecting the improvement goal. In other words, the software module will not reduce the slacks of the non-critical paths to an extent that violates the improvement goal.
3. As a consequence of steps (1) and (2) above, as many sockets as possible are left available for the wires with low or zero slacks, i.e. critical path wires, which enables substantial reduction in critical path delay by leaving open more socket assignment candidates for these critical path wires.

The disclosed embodiments may improve critical path delay, hereinafter also referred to as "latency," over emulation systems that use prior methodologies. A result is improved performance for circuit design emulation.

One approach to pin assignment is to locally improve the assignment on a single CHL pair (consecutively or iteratively for all pairs). Another approach is a global software module to solve the pin assignment challenge globally on all assignments. An advantage of the first approach is that it may be faster to implement and can be parallelized. The second approach may yield improved results in terms of assignment cost, but the computer runtime may be greater than what is tolerable.

The first (local) approach may be implemented using a general software module as follows. Given a set of paths (P), and routing paths associated with each wire, and set of sockets, and an initial timing analysis, re-assign wires to sockets in a way that improves a maximal delay of the path as described below.

Consider an embodiment in which connections between two flip flops are controlled by a same clock edge. The challenge of pin assignment may be formulated as follows.

Let $p_i$ be a path. The set of sockets that this path passes through is $hops_i$.

Let $s_j$ be a socket. A number of wires that pass through this socket is $xdr_j$.

A delay of a path $p_i$ is termed $Delay(p_i)$, defined as a sum of $xdr_j$ over the set of physical sockets that the path passes through.

$$Delay(p_i) = \Sigma_{j \in hops_i} xdr_j$$

A pin assignment is defined as a mapping of all paths to sockets on each of the path's hops. Given a particular pin assignment, a cost of the pin assignment is defined to be the maximum delay of any of the paths for that assignment.

For a pin assignment let P be the set of all the paths assigned:

$$\text{cost(assignment)} = \max_{p_i \in P} Delay(p_i)$$

The pin assignment challenge may then be formulated as follows. For a particular set of paths, a set of path routing constraints and a set of sockets, find an assignment such that its cost will be "minimal".

A cost of a pin assignment may be determined by a delay incurred by its slowest (most critical) path. That delay determines a time to provide for a path to complete (an inverse of the circuit design clock frequency). This is a time set for all the paths in the design, not just critical ones. Therefore, all paths other than the critical paths have more time than they require for the signal they drive to reach its destination. The difference between the allocated time of a path and its required time is called its slack.

The higher the slack for a path (recall, the critical path may have a slack of zero), the more extra time the path has. Therefore, it may be possible to utilize the slack from one path and slow that path down in order to speed up another path. That is a factor influencing the change of wire assignments on sockets that connect CHL pairs. By re-assigning virtual wires from one socket to a different socket it may be possible to increase the xdr of a virtual wire comprising a path with a high slack, e.g. first path, and as a result decrease the xdr of a wire whose path has a small slack, e.g. second path. This slows the first path, but as long as the slack of the first path remains lower than the slack of the second path, the total assignment cost will not increase. Furthermore, the total assignment cost will decrease if the second path is the critical one, because the second path becomes faster.

Initially there already exists some initial assignment of wires in the paths, and delays for all paths are pre-computed. Given this start condition, the software module may:
1. Select an FPGA pair $f_{i,j}$.
2. From the current assignment find the assignment's current cost (defined above) and attempt to improve it iteratively. This is done by choosing a cost goal (improvement goal) that is a factor of the current cost (e.g., multiplying the current cost by 0.8) and computing toward this goal by reassigning the wires between the two FPGAs to the sockets that connect the pair.

3. If the improvement goal is reached, repeat step 2 with a harder improvement goal. Alternatively, if the improvement goal is not reached, repeat step 2 with an easier improvement goal. Continue to repeat step 2 until a heuristic condition is satisfied.

4. Repeat steps 1-3 for other FPGA pairs in the assignment.

Further improvements to the pin assignment software module may include one or more of the following:

1. Incorporate the pin assignment software module completely within the routing module 102.

2. Perform pin assignment globally over the set of all FPGAs (i.e., CHLs) in the emulator hardware, instead of solving iteratively pair-by-pair. Run time of the software module may be higher, but the solution may be more optimal.

3. Modify the firmware to support one or more of these enhancements.

FIG. 1 depicts an exemplary high-level block diagram of a hardware verification system 100, in accordance with one embodiment of the present invention. Hardware verification system 100 may be used to verify, test or debug a circuit design 102. Hardware verification system 100 may include a hardware emulator or prototype system 106 and a computer system 800 that is described in reference to FIG. 8. As depicted in FIG. 1, hardware emulator or prototype system 106 may be coupled to computer system 800, which may include a compiler 104 module that may receive a hardware description language representation of circuit design 102.

Compiler 104 may include a multitude of various software modules that may or may not include a dedicated compiler module. Compiler 104 may transform, change, reconfigure, add new functions to, and/or control the timing of circuit design 102 to facilitate verification, emulation, or prototyping of circuit design 102. Further, compiler 104 may compile circuit design 102 and any associated changes into a binary image used to program hardware emulator or prototype system 106.

Thereby, the logical functions and timing of circuit design 102 that may ultimately be implemented by hardware in an integrated circuit chip may instead be first implemented in hardware emulator or prototype system 106. Among other advantages, verification of circuit design 102 in hardware may be accomplished at much higher speed than by software verification alone.

Hardware emulator or prototype system 106 may include a multitude of emulator units, e.g., unit 120, unit 122-unit 124, each comprising one or more circuit boards, e.g., board 114, board 116-board 118. Each board may comprise one or more programmable processors 108, such as Field Programmable Gate Arrays (FPGAs), and other blocks (not shown), such as memories, input/output devices, other processors, and the like. Hardware emulator or prototype system 106 receives a compiled circuit design 102 from compiler 104, and programs programmable processors 108 to verify behavior of circuit design 102. Hardware emulator or prototype system 106 may include a primary or master system clock from which a number of other clock signals may be generated. Hardware emulator or prototype system 106 may further include a multitude of sockets S, which may be direct electrical connections or a bus providing a multitude of interconnections between programmable processors 108.

Pin assignment involves assigning logical wires to physical low-voltage differential signaling (LVDS) pairs, i.e., sockets S, of programmable processors 108 in such a way that the run frequency of the circuit design as mapped onto hardware emulator or prototype system 106 is maximized. Ideally, a circuit design is mapped for emulation on a single FPGA. When the circuit design is too large to be mapped into a single FPGA, the circuit design is split and mapped onto several FPGAs. Thus a VLSI design is typically mapped into a set or multitude of CHLs, e.g. FPGAs 108, which collectively exhibit the behavior of that VLSI design.

Figure 2A:
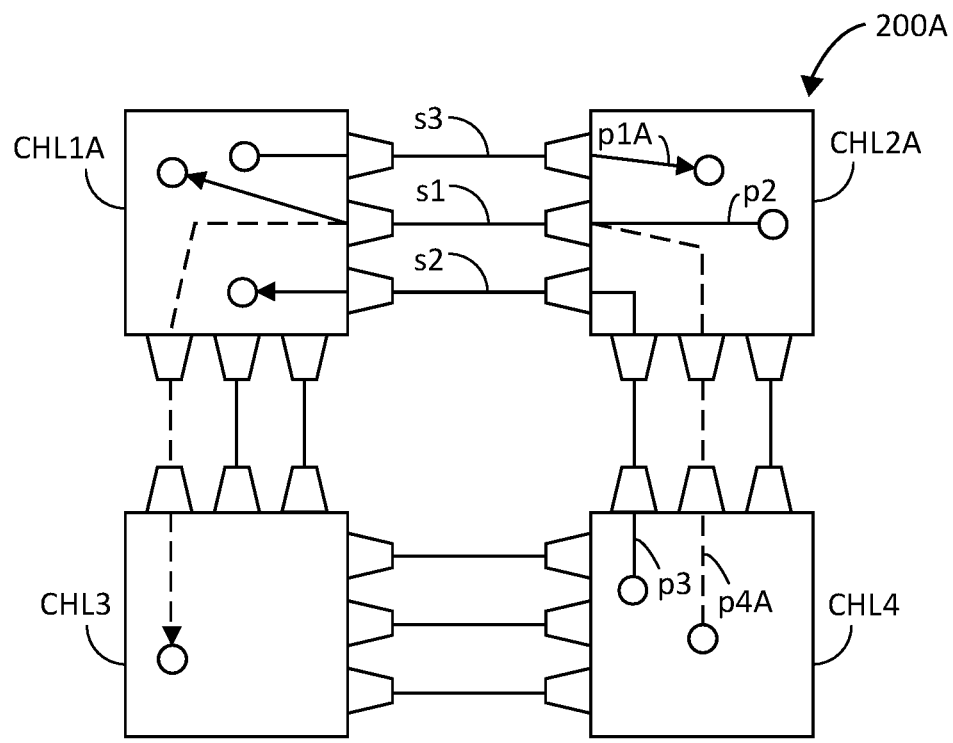
FIG. 2A depicts a simplified exemplary schematic representing the circuit design depicted in FIG. 1 mapped onto a matrix of four CHLs with an initial wiring assignment, in accordance with one embodiment of the present invention.

FIG. 2A depicts a simplified exemplary schematic 200A representing circuit design 102 depicted in FIG. 1 mapped onto a matrix of four CHLs; CHL1A, CHL2A, CHL3, CHL4 with an initial wiring assignment, in accordance with one embodiment of the present invention. As depicted in FIG. 2A, the initial wiring assignment represents the path and wiring constraints between the various CHLs. A path p is defined to start from a register output and end at a register input. Paths may extend from one CHL to a neighboring CHL, e.g. p1A, p2. Further, some of the paths may cross intermediate CHLs to reach their destination (p3, p4A).

The routing of a path between two neighboring CHLs is called a hop. For example, paths p1A, p2 have one hop, p3 has two hops and p4A, depicted in dashed line, has three hops. Schematic 200A further includes sockets s1, s2, s3 that connect between neighboring CHL1A, CHL2A. Each socket may have more than one virtual wire passing through it, which requires those wires to be virtual wires using TDM. For example, socket s1 has two virtual wires passing through it that are associated with p2, p4A. Having two paths assigned the same socket causes that socket to be two times slower because the transfer of wire data is time multiplexed between the wire associated with p2 and the wire associated with p4A.

The assignment of virtual wires to socket determines how much delay time will be on the paths associated with the assigned virtual wires. The path with the biggest delay is referred to as the critical path and dictates how fast the mapped design will execute in emulation. Therefore reducing the delay time of the critical path may dominate the performance of the implementation.

For the example wire assignments between CHL1A and CHL2A, p4A is routed to share socket s1 with p2, while p1A does not share socket s3 with any other wire. However, p4A is a longer path than p1A and sharing a socket slows p4A down further. It therefore is an improvement for hardware system speed to switch the wire-to-socket assignments between p4A and p1A because the latency of p4A is more critical than the latency of p1A. That is, the wire to socket assignments should be transformed such that p1A should share socket s1 with p2, and p4A should be unshared to improve hardware speed because in this example p4A is the critical path and dictates a highest speed of the hardware system represented by schematic 200A.

Figure 2B:
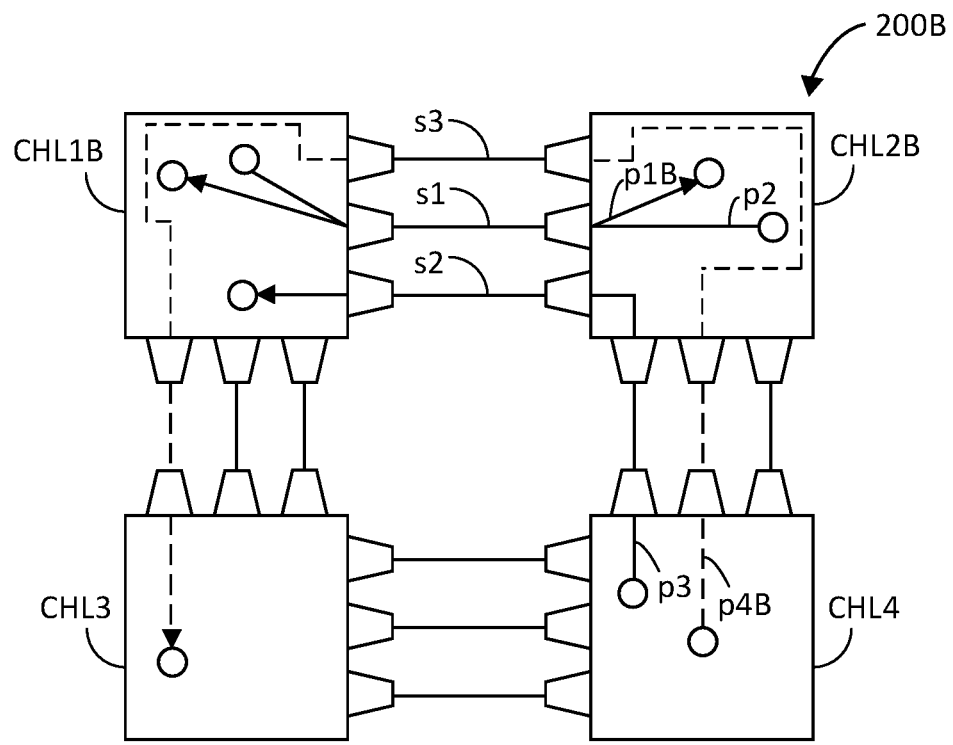
FIG. 2B depicts a simplified exemplary schematic representing an improved reassignment of the wires of the mapped circuit design depicted in FIG. 2A, in accordance with one embodiment of the present invention.

FIG. 2B depicts a simplified exemplary schematic 200B representing an improved reassignment of wires associated with paths p of mapped circuit design 102 depicted in FIG. 2A, in accordance with one embodiment of the present invention. Schematic 200B includes the same elements and functions as schematic 200A depicted in FIG. 2A with the following exceptions. The data representing the example wire assignments between CHL1A and CHL2A in schematic 200A have been transformed by the embodiments described herein into data representing the wire assignments between CHL1B and CHL2B in schematic 200B. For the reasons described above, the transformation has switched the wire-to-socket assignments between example wires associated with paths p4A and p1A resulting in the reassigned pin-assignments such that the wire associated with p1B is routed to share socket s1 with the wire associated with path p2, and the wire associated with p4B is reassigned to socket s3 without sharing socket s3 with any other wire.

Paths p4A and p4B represent a net having the same signal driver and ending receiver circuits but are mapped into the CHLs differently by having different associated wire-to-socket assignments. In other words, p4A and p4B perform the same circuit function but p4B does not use TDM as p4A requires, which in-turn makes p4B an improved faster path compared to p4A. The transformation is described in greater detail below.

Figure 3:
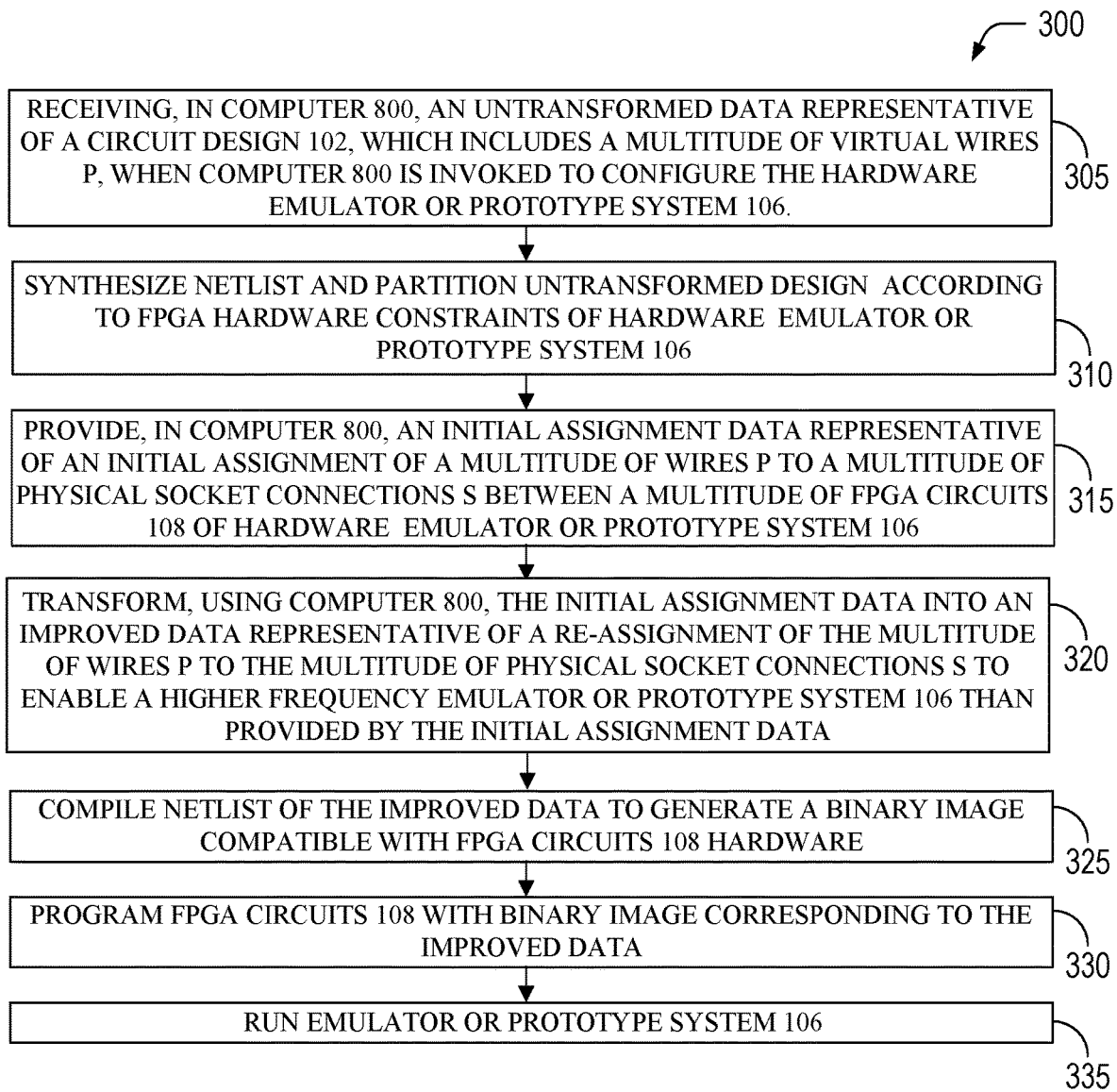
FIG. 3 depicts a simplified exemplary flowchart for configuring a hardware emulator or prototype system to transform a data representing an initial wiring assignment, in accordance with one embodiment of the present invention.

FIG. 3 depicts a simplified exemplary flowchart 300 for configuring hardware emulator or prototype system 106 to transform a data representing an initial wiring assignment, e.g. example schematic 200A as depicted in FIG. 2A, in accordance with one embodiment of the present invention. Referring simultaneously to FIGS. 1-3, flowchart 300 depicts receiving 305, in compiler 104 executing in computer 800, an untransformed data, e.g. example schematic 200A representative of circuit design 102 including a multitude of wires each associated with a different one of a multitude of paths P, e.g. nets that will become p1A, p2, p3, p4A after partition and initial routing, when computer 800 is invoked to configure hardware emulator or prototype system 106. Then compiler 104 synthesizes 310 a netlist, such as for example in EDIF or other netlist formats, and partitions the untransformed design according to CHL or FPGA hardware constraints of hardware emulator or prototype system 106.

An initial routing by compiler 104 provides 315, in computer 800, an initial assignment data representative of an initial assignment of a multitude of wires each associated with a different one of a multitude of paths P, e.g. p1A, p2, p3, p4A, to a multitude of physical socket connections S, e.g. s1, s2, s3, between a multitude of FPGA circuits 108 of hardware emulator or prototype system 106, e.g. CHL1A, CHL2A.

Next, compiler 104 transforms 320, using computer 800, the initial assignment data, e.g. example schematic 200A into an improved data, e.g. example schematic 200B. Example schematic 200B is representative of a re-assignment of the multitude of wires each associated with a different one of a multitude of paths P, e.g. p1B, p2, p3, p4B to the multitude of physical socket connections S to enable a higher frequency emulator or prototype system 106 than provided by the initial assignment data of example schematic 200A.

Then compiler 104 compiles 325 the netlist of the improved data, e.g. example schematic 200B, to generate a binary image compatible with the hardware of CHL or FPGA circuits 108. Next, compiler 104 uses computer 800 to program 330 CHL or FPGA circuits 108 with the binary image corresponding to the improved data, e.g. example schematic 200B. After programming, hardware emulator or prototype system 106 may be run 335 under the guidance of computer 800 to verify or emulate circuit design 102 at higher speed than the initial routing with the wire associated with path p4A by using the transformed hardware configuration provided by the wire associated with path p4B. Alternatively, hardware emulator or prototype system 106 may be run 335 decoupled from computer 800 as a stand-alone hardware prototype system operating at improved higher prototype system speed using the improved wire and associated path routing.

Figure 4:
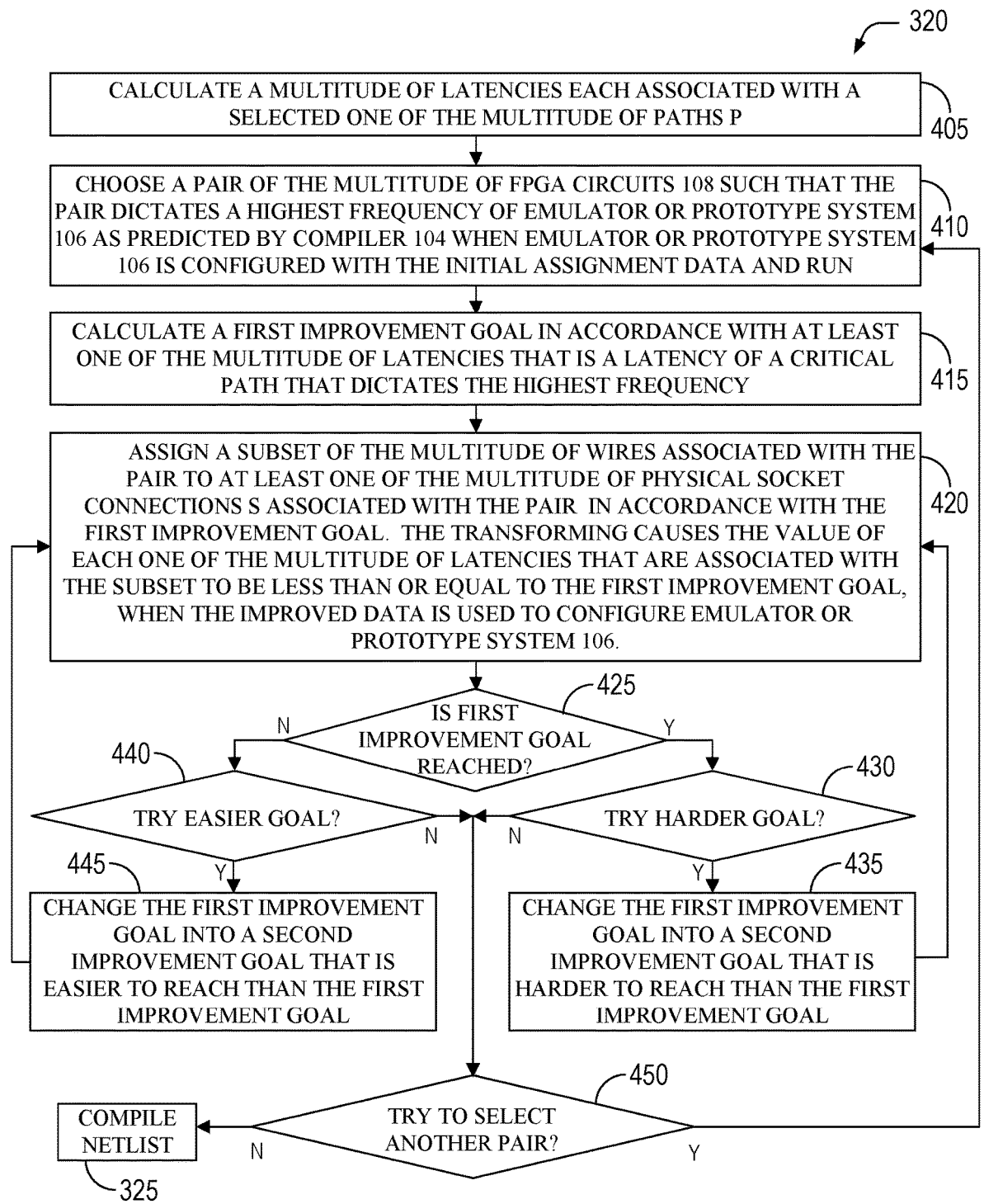
FIG. 4 depicts a simplified exemplary flowchart for the step of transforming the initial wiring assignment data into a data representing an improved wiring assignment depicted in FIG. 3, in accordance with one embodiment of the present invention.

FIG. 4 depicts a simplified exemplary flowchart 320 for step 320 depicted in FIG. 3 of transforming the initial wiring assignment data, e.g. example schematic 200A, into a data representing an improved wiring assignment, e.g. example schematic 200B, depicted in FIGS. 2A-2B, in accordance with one embodiment of the present invention. Locally improving the assignment of a wire that is part of the critical path will globally improve the critical path because that wire is a segment of the critical path. Referring simultaneously to FIGS. 2-4, flowchart 320 depicts compiler 104 calculating 405 a multitude of latencies or path delays each associated with a selected one of the multitude of wires each associated with a different one of a multitude of paths P. Compiler 104 chooses 410 a pair, e.g. CHL1A, CHL2A, of the multitude of FPGA circuits 108 such that the pair dictates a highest frequency of emulator or prototype system 106 as predicted by compiler 104 when emulator or prototype system 106 is configured with the initial assignment data and run as simulated by compiler 104 without running the emulator or prototype system 106 in real-time.

Recall that the pair CHL1A, CHL2A dictate a highest frequency of emulator or prototype system 106 because the wire associated with p4A runs through socket s1 that connects between CHL1A and CHL2A. Also recall that the wire associated with p4A is a critical path delay, at least when the wire associated with p4A shares s1 with the wire associated with p2 in the initial assignment. It is understood that after the upcoming reassignment to improve the speed of emulator or prototype system 106, p4A may or may not continue to be a critical path once the wire associated with p4A is reassigned to a dedicated socket.

Compiler 104 calculates 415 a first improvement goal in accordance with at least one of the multitude of latencies that is a latency or delay of a critical path associate with a wire, hereinafter also referred to as a "critical wire", e.g. p4A, that dictates the highest frequency of emulator or prototype system 106 in the initial wire assignment, e.g. example schematic 200A. Then compiler 104 assigns 420 a subset of the multitude of wires each associated with a different one of the multitude of paths P associated with the chosen CHL pair, e.g. CHL1A, CHL2A to at least one of the multitude of physical socket connections S associated with the pair in accordance with the first improvement goal. The transforming causes the value of each one of the multitude of latencies or delays that are associated with the subset to be less than or equal to the first improvement goal, when the improved data is used to configure emulator or prototype system 106.

After assigning 420, compiler 104 determines 425 whether or not the first improvement goal is reached. If the first improvement goal is reached, then compiler 104 determines if the compiler will try 430 a harder goal than the first improvement goal for the next wire assignment iteration. If compiler 104 determines it will try a harder goal, then compiler 104 heuristically changes 435 the first improvement goal into a second improvement goal that is harder to reach than the first improvement goal and the compiler loops back to step 420 again, thus ensuring the wire assignment solution tries to improve the speed of emulator or prototype system 106 when run in real-time.

If the first improvement goal is not reached at step 425, then compiler 104 determines if the compiler will try 440 an easier goal than the first improvement goal for the next wire assignment iteration. If compiler 104 determines it will try an easier goal, then compiler 104 heuristically changes 445 the first improvement goal into a second improvement goal that is easier to reach than the first improvement goal and the compiler loops back to step 420 again, thus ensuring convergence to a solution.

If compiler 104 determines not to try either a harder or easier improvement goal at steps 430, 440 respectively, then compiler 104 determines whether to try 450 to select another CHL pair. If compiler 104 does try to select another CHL pair, then the flow iterates back to step 410. If compiler 104 does not try to select another CHL pair, then compiler 104 returns to step 325 referenced in FIG. 3 to compile the netlist in preparation to program the FPGA circuits with the improved wire to socket assignment data.

Figure 5:
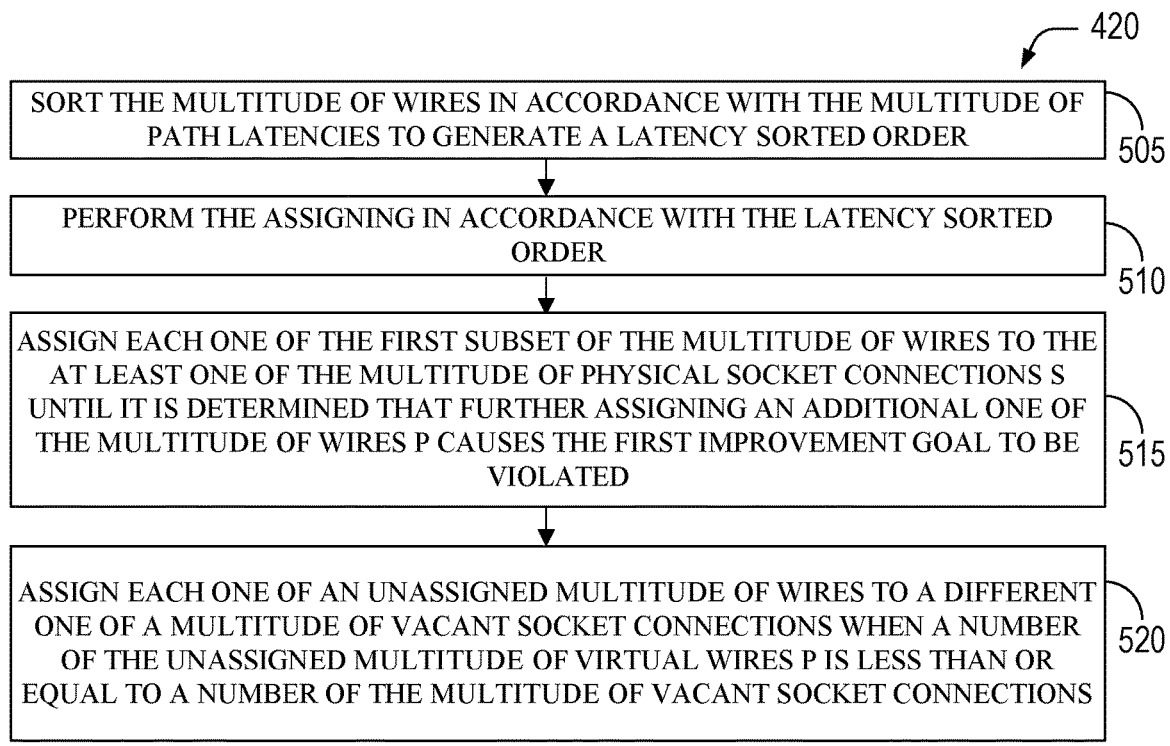
FIG. 5 depicts a simplified exemplary flowchart for the step of assigning a subset of a multitude of wires depicted in FIG. 4, in accordance with one embodiment of the present invention.

FIG. 5 depicts a simplified exemplary flowchart for the step 420 of assigning a subset of a multitude of wires depicted in FIG. 4, in accordance with one embodiment of the present invention. Compiler 104 sorts 505 the multitude of wires each associated with a different one of the multitude of paths P in accordance with the multitude of path latencies to generate a latency sorted order. Compiler 104 may perform 510 the assigning in accordance with the latency sorted order.

Compiler 104 then assigns 515 each one of the first subset of the multitude of wires each associated with a different one of the multitude of paths P to the at least one of the multitude of physical socket connections S until it is determined that further assigning an additional one of the multitude of wires each associated with a different one of the multitude of paths P causes the first improvement goal to be violated. In performing the assignment of the subset, compiler 104 uses data predicting the TDM circuit resources available on the pair of CHL to assign as many non-critical wires to the same socket S as possible to ensure other more critical wires are assigned to sockets without the use of TDM as described elsewhere.

When the end of the wiring assignments is near, compiler 104 may assign 520 each one of an unassigned multitude of wires each associated with a different one of the multitude of paths P to a different one of a multitude of vacant socket connections when a number of the unassigned multitude of wires P is less than or equal to a number of the multitude of vacant socket connections. Step 520 thus takes advantage of any remaining surplus of unassigned sockets by assigning the remaining unassigned wires on a single wire to single socket basis.

Figure 6A:
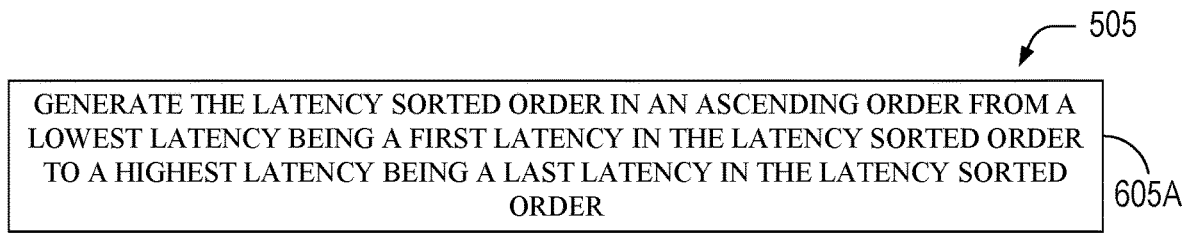
FIG. 6A depicts a simplified exemplary flowchart for the step of sorting depicted in FIG. 5 using an ascending sort order, in accordance with one embodiment of the present invention.

FIG. 6A depicts a simplified exemplary flowchart for the step 505 of sorting depicted in FIG. 5 using an ascending sort order, in accordance with one embodiment of the present invention. FIG. 6A depicts that compiler 104 generates 605A the latency sorted order in an ascending order from a lowest latency being a first latency in the latency sorted order to a highest latency being a last latency in the latency sorted order. Notice that the slack of the path with the highest latency is 0. Further, sorting the paths according to latencies in ascending sort order is equivalent to sorting the paths according to slacks in descending sort order. Accordingly, in one embodiment, the multitude of wires may be sorted in accordance with a multitude of slacks to generate a slack sorted order. Then the assigning may be performed in accordance with the slack sorted order.

Figure 6B:
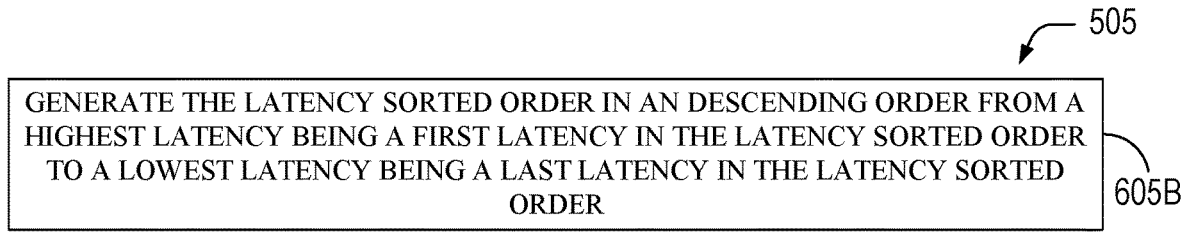
FIG. 6B depicts a simplified exemplary flowchart for the step of sorting depicted in FIG. 5 using a descending sort order, in accordance with one embodiment of the present invention.

FIG. 6B depicts a simplified exemplary flowchart for the step 505 of sorting depicted in FIG. 5 using a descending sort order, in accordance with one embodiment of the present invention. In an alternative embodiment to that depicted in FIG. 6A, FIG. 6B depicts that compiler 104 generates 605B the latency sorted order in an descending order from a highest latency being a first latency in the latency sorted order to a lowest latency being a last latency in the latency sorted order.

In one embodiment, given a CHL pair and an improvement goal, an improved pin assignment software module process may include the following steps.

1. Disconnect all virtual wires connecting the two CHLs.
2. Begin reassigning virtual wires to sockets, trying to first "stuff" the wires with the biggest slack to the fewest sockets, to achieve a configured improvement goal. In other words, do not reduce the slack of the wires below the improvement goal.

The above pin assignment process increases the number of sockets available for wires with low or zero slack, enabling a reduction in the delay time of those low slack wires or paths.

In one embodiment, a pin assignment process may include the following steps.

1. Start with an initial pin assignment.
2. Select a CHL pair between which a critical path is passing. If there exists more than one such CHL pair, choose a pair that has more critical paths. Consider how many iterations have been performed on this CHL pair, the xdr of the pair, etc.
3. Set an improvement goal, i.e. improvement setting, as a percentage improvement of the cost of the critical path, e.g. to improve the critical path by 20%.
4. Execute against the improvement setting by reassigning the wires among the sockets. If the improvement goal is not reached by the wiring re-assignment, reduce the improvement setting or select a next CHL pair. If the improvement goal is reached, increase the improvement setting or select a next CHL pair.
5. Re-compute timing of the circuit design if the improvement goal is reached.
6. Conclude the process when further iteration will yield no or negligible improvement, e.g. below a predefined incremental improvement.

The software module in compiler 104 assumes an initial state in which routing is done, i.e., all wires have predetermined initial xdr values (based on uniform distribution), and timing analysis is done, i.e.

$$\max_{p_i \in P} Delay(p_i)$$

is computed and Slack($p_i$) is computed for each path.

In one embodiment, improvements may be achieved locally. The pin assignment routine 300 need not examine the entire circuit design to identify improvements. Improvements may be performed on a CHL pair basis. Results may be suboptimal, however the pin assignment routine 300 may operate iteratively, e.g. by successive improvements on the same CHL pair, one CHL pair at a time. This enables tradeoff between computation time and desired improvement.

In more detail, a software module for one embodiment of a pin assignment routine is as follows:

Let $f_{ij}$ be an FPGA pair ($f_i$, $f_j$). Define the set $S_{ij}$ to be the set of sockets that connect the pair.

Let $s \in S_{ij}$ be a socket that belongs to the set. Define xdr(s) to be the count of the number of wires that are assigned to socket s.

Define $W_{ij}$ to be the set of wires that go between the pair $f_{ij}$.

Define the required time of a path $p_i$, denoted as required ($p_i$), as the time allowed for a signal to travel from source to destination. The required time may be in accordance with the time allocated to the most critical path in the current allocation solution, which influences the required time of the rest of the paths. The solution has to allow the signal on this critical path to reach its destination on time. Thereby, the rest of the paths will have some slack.

Define a function time(int) to accept an integer xdr value, and return a real time delay. This function is used to compute xdr delays according to some step function. For example, for xdr of 1, time will return 10 ns and for xdr values between 2-8, time will return 20 ns, etc.

Define a function time(pi) which computes the real time delay of a path $p_i$ as:

$$time(p_i) = \Sigma_{j \in hops_i} time(xdr_j)$$

For a path $p_i$ define Slack($p_i$) as the slack of path $p_i$, computed as required($p_i$)−time($p_i$). The slack provides a measure of how critical the path is in the current solution, i.e. the slack of the most critical path is usually zero. The bigger the slack, the less critical the associated path is.

Let $f_{ij}$ be a CHL pair. Let G be a goal cost improvement or improvement goal, which is an amount by which to reduce the cost. Let $W_{ij}$ be a set of virtual wires assigned on the sockets between $f_{ij}$.

In one embodiment, the main routine may include the following steps.

1. Start incremental timing framework
2. For-each ($f_{ij} \in F$) do
   a.

$$NewGoalDelay = \alpha * \max_{p_j \in P} time(p_j),$$

where "α" is equal to the improvement goal, such for example 0.1, 0.2, 0.3, and the like.
   b. Do
      i. GoalDelay=NewGoalDelay;
      ii. Status=SplitLVDSPairs(GoalDelay,$f_{ij}$);
      iii. If (status=="Failed") NewGoalDelay=GoalDelay/2;
      iv. If (status=="Passed") NewGoalDelay=GoalDelay*1.5;
   c. While (|GoalDelay−NewGoalDelay|>5 ns).

Note: between iterations, incremental timing calculates changes in the delays and slacks of the paths.

In one embodiment, the SplitLVDSPairs(GoalDelay, $f_{ij}$) routine may include the following steps.

1. Save the current assignment of virtual wires $W_{ij}$.
2. Sort wires $W_{ij}$ by the descending slack of the path that each wire belongs to; meaning the less critical first.
3. Save the slacks of all the paths in an array startSlacks.
4. Save the xdr times for all path hops between pair $f_{ij}$ in an array prevTime. prevTime[i] holds the part of time($p_i$) that it takes to cross between the pair $f_{ij}$.
5. Remove all the wire assignments for $W_{ij}$ but remember the path slacks.
6. Let M=number of sockets available between pair $f_{ij}$.
7. Set m=0.
8. For(i=0; i<size($W_{ij}$)); i++)
   I. If size($W_{ij}$)−i<=M−m//can allocate all remaining wires to their own non-multiplexed socket.
      a. Assign all remaining wires to remaining sockets.
      b. Return SUCCESS.
   II. While $w_i$ not assigned,
      a. Test assign $w_i$ to socket $s_m$
      b. Set j such that:

startSlacks[j]==$min_{p_i \in P_{s_m}}$ startSlacks[i]

c.

$\Delta$=time(xdr($s_m$))−prevTime[j]

d. If $\Delta + G <$ startSlack[j]

do // cannot assign to this socket.
      i. m++
      ii. If (m>=M)//no more sockets left
         I. Restore the current solution.
         II. Return FAILURE.
      e. Else commit assignment of $w_i$ to socket $s_m$
9. Return SUCCESS.

Figure 7:
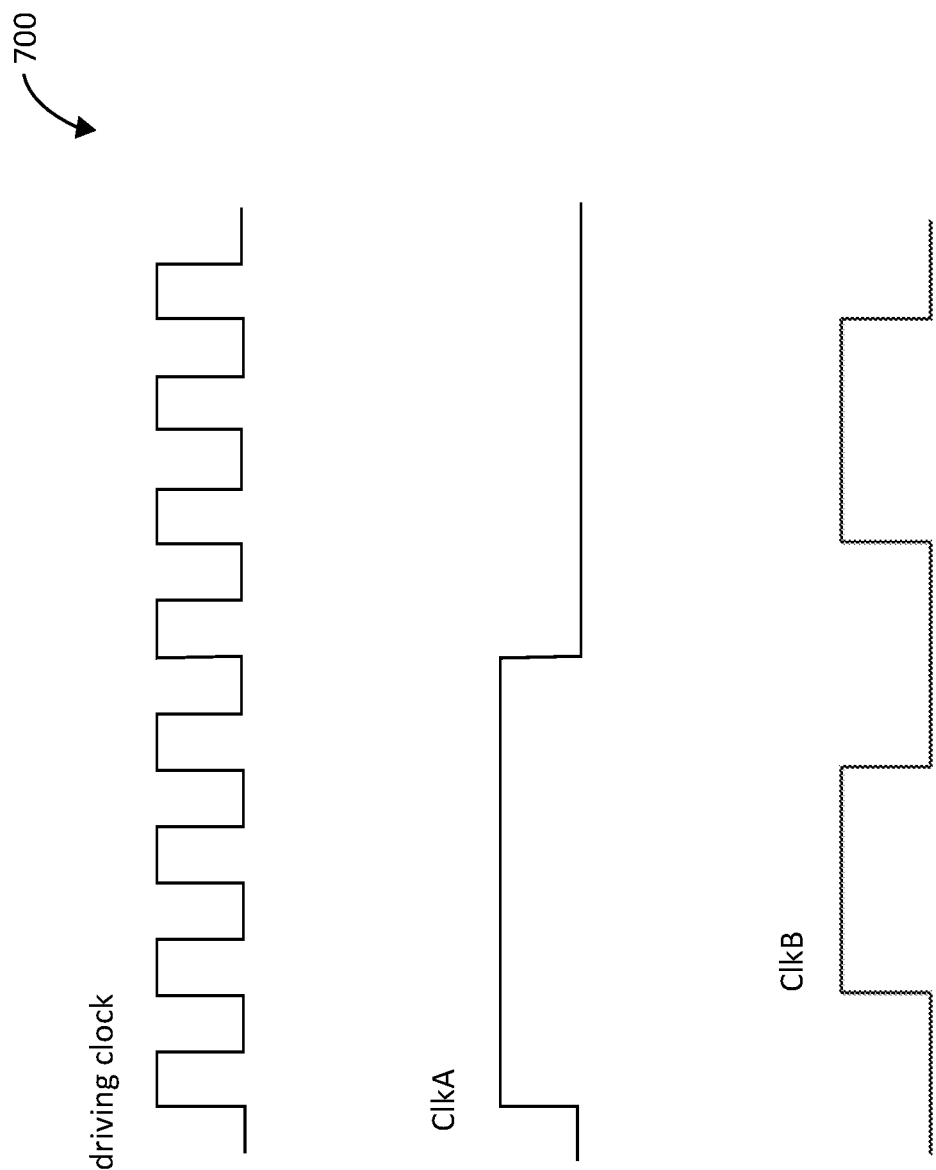
FIG. 7 depicts a simplified exemplary timing diagram of a multi-clock domain, in accordance with one embodiment of the present invention.

FIG. 7 depicts a simplified exemplary timing diagram 700 of a multi-clock domain, in accordance with one embodiment of the present invention. One difference between a single clock domain environment and a multi-clock domain environment is that time allocated for a signal to reach from source to destination is different for each path. In a single clock domain environment, signals have one clock cycle to reach from source to destination. In a multi clock domain, the time allocated for each signal may be in accordance with the following.

1. The clock and edge driving the source.
2. The clock and edge driving the destination.

Given a clock set, each element in a clock pair may be:

1. A clock denoted as clkX.
2. A clock negated denoted as !clkX.

The number of possible clock pairs is therefore the square of twice the number of clocks (although not all pairs may exist in actuality in the circuit emulator). Each such clock pair has a count number.

The mapped circuit design is assumed to have a fast driving or master clock that drives the rest of the clocks. The other clocks are driven at some ratio of the driving clock.

The following five rules may determine the count of each clock pair:

1. The count of (clkX, clkX) is determined to be the ratio of clkX from the driving clock.
2. The count of (clkX, !clkX), and also (!clkX, clkX) is determined to be half the ratio of clkX from the driving clock.
3. The count of (clkX, clkY) is determined to be 1, where clkX and clkY are derived from different edges of the master clock.
4. The count of (clkX, clkY) where clkX and clkY are synchronized is determined to be the ratio of the fastest clock of the pair.
5. Counts are symmetrical (e.g. see rule 2 above).

FIG. 7 depicts a driving clock and two derived clocks (clkA and clkB) with ratios 8 and 4 respectively. Then the counts of some of the clock pair combinations is given by Table 1.

TABLE 1

| Clock Pair | Count |
| --- | --- |
| (ClkA, ClkA) | 8 |
| (ClkA, !ClkA) | 4 |
| (ClkB, ClkB) | 4 |
| (ClkB, !ClkB) | 2 |
| (ClkA, ClkB) | 1 |
| (!ClkA, ClkB) | 1 |
| Etc. | Etc. |

A signal on a path with a pair that has a higher count has more allocated time to complete its traversal. This factor is introduced into the computation of all path delays. In other words in one embodiment, at least one of the multitude of latencies may be further associated with a count of the multitude of clock signals. This may be done by dividing the delay of a path by its count. Let $C_i$ be the count of path $p_i$, then:

$$FactoredDelay(p_i) = \frac{Delay(p_i)}{C_i}$$

The assignment cost is calculated according to the factored delays:

$$cost(assignment) = \max_{p_i \in P} FactoredDelay(p_i)$$

and the pin assignment problem formulation is as previously described for the single clock domain environment (but with a different cost computation).

Some implementations may allow only particular values for xdr's. For example, only values of 2, 4, 6, 8 may be allowed, with increments thereafter by 8: 16, 24, etc. This may be taken into account when updating the delays (or factored delays) of paths after an assignment to a particular socket.

Figure 8:
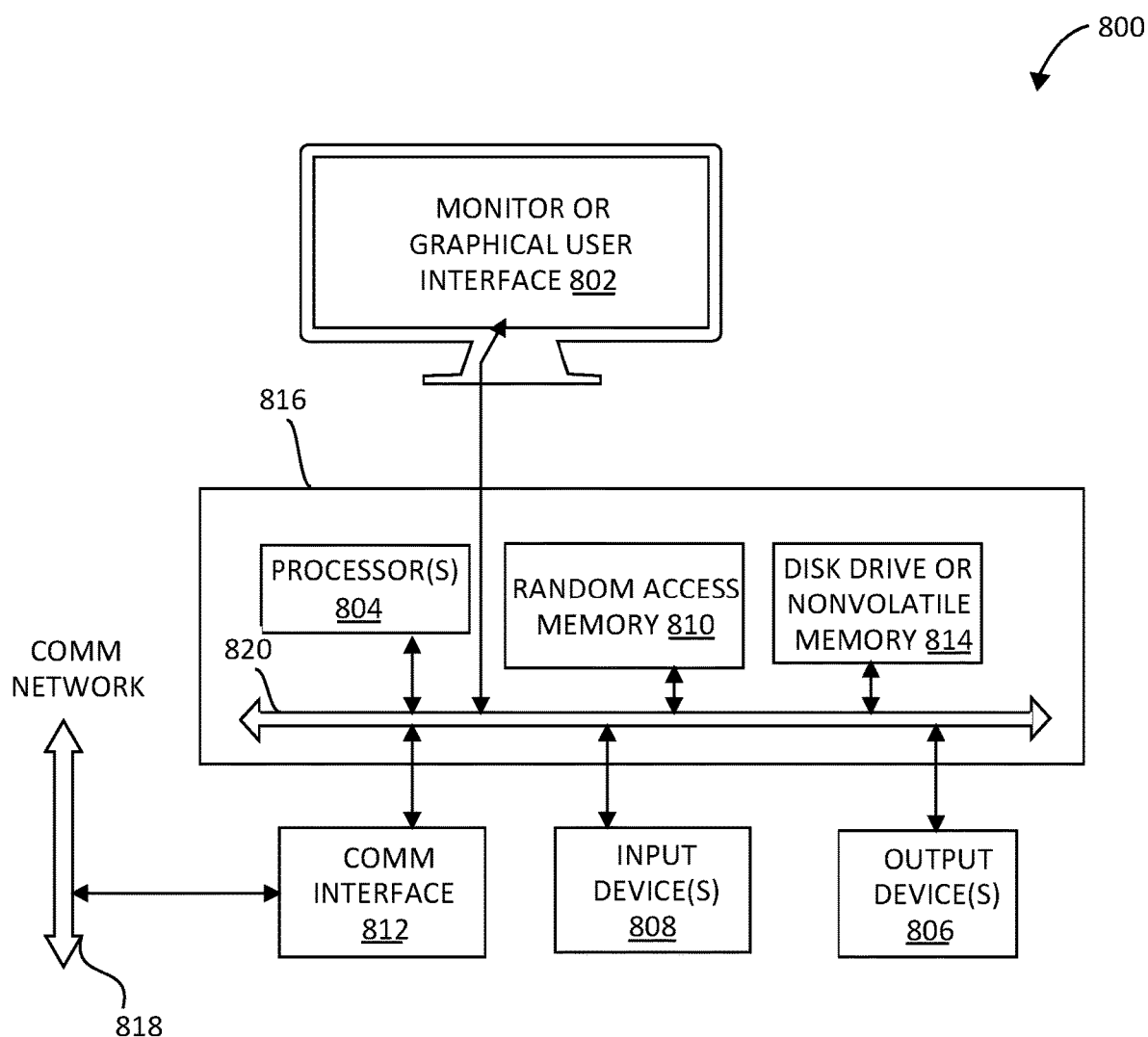
FIG. 8 is an example block diagram of a computer system that may incorporate embodiments of the present invention.

FIG. 8 is an example block diagram of a computer system 800 that may incorporate embodiments of the present invention. FIG. 8 is merely illustrative of a machine system to carry out aspects of the technical processes described herein, and does not limit the scope of the claims. One of ordinary skill in the art would recognize other variations, modifications, and alternatives. In one embodiment, computer system 800 typically includes a monitor or graphical user interface 802, a computer 816, a communication network interface 812, input device(s) 808, output device(s) 806, and the like.

As depicted in FIG. 8, the computer 816 may include one or more processor(s) 804 that communicate with a number of peripheral devices via a bus subsystem 820. These peripheral devices may include input device(s) 808, output device(s) 806, communication network interface 812, and a storage subsystem, such as a random access memory 810 and a disk drive or nonvolatile memory 814.

The input device(s) 808 include devices and mechanisms for inputting information to the computer 816. These may include a keyboard, a keypad, a touch screen incorporated into monitor or graphical user interface 802, audio input devices such as voice recognition systems, microphones, and other types of input devices. In various embodiments, input device(s) 808 are typically embodied as a computer mouse, a trackball, a track pad, a joystick, wireless remote, drawing tablet, voice command system, eye tracking system, and the like. Input device(s) 808 typically allow a user to select objects, icons, text and the like that appear on monitor or graphical user interface 802 via a command such as a click of a button or the like.

Output device(s) 806 include all possible types of devices and mechanisms for outputting information from computer 816. These may include a display (e.g., monitor or graphical user interface 802), non-visual displays such as audio output devices, etc.

Communication network interface 812 provides an interface to communication networks (e.g., communication network 818) and devices external to computer 816. Communication network interface 812 may serve as an interface for receiving data from and transmitting data to other systems. Embodiments of communication network interface 812 typically include an Ethernet card, a modem (telephone, satellite, cable, ISDN), (asynchronous) digital subscriber line (DSL) unit, FireWire interface, USB interface, and the like. For example, communication network interface 812 may be coupled to communication network 818 via a FireWire bus, or the like. In other embodiments, communication network interface 812 may be physically integrated on the motherboard of computer 816, and may be a software program, such as soft DSL, or the like.

In various embodiments, the computer system 800 may also include software that enables communications over a network such as the HTTP, TCP/IP, RTP/RTSP protocols, and the like. In alternative embodiments, other communications software and transfer protocols may also be used, for example IPX, UDP or the like. In some embodiments, computer 816 in the processor(s) 804 may include one or more microprocessors from Intel®. Further, one embodiment, computer 816 includes a UNIX-based operating system.

Random access memory 810 and disk drive or nonvolatile memory 814 are examples of tangible media configured to store data and instructions to implement various embodiments of the processes described herein, including executable computer code, human readable code, or the like. Other types of tangible media include floppy disks, removable hard disks, optical storage media such as CD-ROMS, DVDs and bar codes, semiconductor memories such as flash memories, non-transitory read-only-memories (ROMS), battery-backed volatile memories, networked storage devices, and the like. Random access memory 810 and disk drive or nonvolatile memory 814 may be configured to store the basic programming and data constructs that provide the functionality of the disclosed processes and other embodiments thereof that fall within the scope of the present invention.

Software code modules and instructions that implement embodiments of the present invention may be stored in random access memory 810 and/or disk drive or nonvolatile memory 814. These software modules may be executed by processor(s) 804. Random access memory 810 and disk drive or nonvolatile memory 814 may also provide a repository for storing data used by the software modules.

Random access memory 810 and disk drive or nonvolatile memory 814 may include a number of memories including a main random access memory (RAM) for storage of instructions and data during program execution and a read only memory (ROM) in which fixed non-transitory instructions are stored. Random access memory 810 and disk drive or nonvolatile memory 814 may include a file storage subsystem providing persistent (non-volatile) storage for program and data files. Random access memory 810 and disk drive or nonvolatile memory 814 may include removable storage systems, such as removable flash memory.

Bus subsystem 820 provides a mechanism for letting the various components and subsystems of computer 816 communicate with each other as intended. Although communication network interface 812 is depicted schematically as a single bus, alternative embodiments of bus subsystem 820 may utilize multiple busses.

FIG. 8 is representative of a computer system capable of implementing embodiments of the present invention. It will be readily apparent to one of ordinary skill in the art that many other hardware and software configurations are suitable for use with embodiments of the present invention. For example, the computer may be a desktop, portable, rack-mounted or tablet configuration. Additionally, the computer may be a series of networked computers. Further, the use of other microprocessors are contemplated, such as Pentium™ or Itanium™ microprocessors; Opteron™ or AthlonXP™ microprocessors from Advanced Micro Devices, Inc; and the like. Further, other types of operating systems are contemplated, such as Windows®, WindowsXP®, WindowsNT®, or the like from Microsoft Corporation, Solaris from Sun Microsystems, LINUX, UNIX, and the like. In still other embodiments, the techniques described above may be implemented upon a chip or an auxiliary processing board.

Various embodiments of the present invention may be implemented in the form of logic in software or hardware or a combination of both. The logic may be stored in a computer readable or machine-readable non-transitory storage medium as a set of instructions adapted to direct a processor of a computer system to perform a set of steps disclosed in embodiments of the present invention. The logic may form part of a computer program product adapted to direct an information-processing device to perform a set of steps disclosed in embodiments of the present invention. Based on the disclosure and teachings provided herein, a person of ordinary skill in the art will appreciate other ways and/or methods to implement the present invention.

The data structures and code described herein may be partially or fully stored on a computer-readable storage medium and/or a hardware module and/or hardware apparatus. A computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described herein include, but are not limited to, application-specific integrated circuits (ASICs), field-programmable gate arrays (FPGAs), dedicated or shared processors, and/or other hardware modules or apparatuses now known or later developed.

The methods and processes described herein may be partially or fully embodied as code and/or data stored in a computer-readable storage medium or device, so that when a computer system reads and executes the code and/or data, the computer system performs the associated methods and processes. The methods and processes may also be partially or fully embodied in hardware modules or apparatuses, so that when the hardware modules or apparatuses are activated, they perform the associated methods and processes. The methods and processes disclosed herein may be embodied using a combination of code, data, and hardware modules or apparatuses.

The above descriptions of embodiments of the present invention are illustrative and not limitative. In addition, similar principles as described corresponding to latches and/or flops can be applied to other sequential logic circuit elements. Other modifications and variations will be apparent to those skilled in the art and are intended to fall within the scope of the appended claims.

What is claimed is:

1. A computer-implemented method for configuring a hardware system, the method comprising:
   providing, using the computer, a first data representative of a first assignment of a plurality of wires to a plurality of physical connections of a plurality of logic circuits disposed in the hardware system;
   calculating, using the computer, a first plurality of latencies associated with the plurality of wires of the first assignment;
   providing, using the computer, a second data representative of a second assignment of the plurality of wires to the plurality of physical connections; and
   calculating, using the computer, a second plurality of latencies associated with the plurality of wires of the second assignment, wherein a latency associated with at least a first one of the plurality of wires in the second assignment is less than the latency associated with the at least first one of the plurality of wires in the first assignment, and wherein at least one of the physical connections in each of the first and second assignments is configured to multiplex between wires connected thereto.

2. The method of claim 1 further comprising:
   sorting the plurality of wires in accordance with the first plurality of latencies to generate a latency sorted order, wherein the second assignment is performed in accordance with the latency sorted order.

3. The method of claim 2, wherein the latency sorted order is in an ascending order from a lowest latency being a first latency in the latency sorted order to a highest latency being a last latency in the latency sorted order.

4. The method of claim 2, wherein the latency sorted order is in a descending order from a highest latency being a first latency in the latency sorted order to a lowest latency being a last latency in the latency sorted order.

5. The method of claim 2 further comprising:
   assigning each one of an unassigned plurality of wires to a different one of a plurality of vacant connections when a number of the unassigned plurality of wires is less than or equal to a number of the plurality of vacant connections.

6. The method of claim 1 further comprising:
   assigning each one of a first subset of the plurality of wires to at least one of the plurality of physical connections until it is determined that further assigning an additional one of the plurality of wires causes a cost to exceed a predetermined value.

7. The method of claim 1, wherein the plurality of logic circuits is selected from the group consisting of programmable gate arrays (FPGA), and configurable hardware logic (CHL).

8. The method of claim 1 further comprising:
   selecting a pair of the plurality of logic circuits to achieve a highest frequency of the hardware system.

9. The method of claim 1, wherein at least one of the plurality of latencies is further associated with a count of a plurality of clock signals.

10. A hardware configuration system adapted to:
   provide a first data representative of a first assignment of a plurality of wires to a plurality of physical connections of a plurality of logic circuits disposed in the hardware configuration system;
   calculate a first plurality of latencies associated with the plurality of wires of the first assignment;
   provide a second data representative of a second assignment of the plurality of wires to the plurality of physical connections; and
   calculate a second plurality of latencies associated with the plurality of wires of the second assignment, wherein a latency associated with at least a first one of the plurality of wires in the second assignment is less than the latency associated with the at least first one of the plurality of wires in the first assignment, and wherein at least one of the physical connections in each of the first and second assignments is configured to multiplex between wires connected thereto.

11. The hardware configuration system of claim 10 wherein the hardware configuration system is further adapted to sort the plurality of wires in accordance with the first plurality of latencies to generate a latency sorted order, wherein the second assignment is performed in accordance with the latency sorted order.

12. The hardware configuration system of claim 11, wherein the latency sorted order is in an ascending order from a lowest latency being a first latency in the latency sorted order to a highest latency being a last latency in the latency sorted order.

13. The hardware configuration system of claim 11, wherein the latency sorted order is in a descending order from a highest latency being a first latency in the latency sorted order to a lowest latency being a last latency in the latency sorted order.

14. The hardware configuration system of claim 11 wherein the hardware configuration system is further adapted to:
assign each one of an unassigned plurality of wires to a different one of a plurality of vacant connections when a number of the unassigned plurality of wires is less than or equal to a number of the plurality of vacant connections.

15. The hardware configuration system of claim 10 wherein the hardware configuration system is further adapted to:
assign each one of a first subset of the plurality of wires to at least one of the plurality of physical connections until it is determined that further assignment of an additional one of the plurality of wires causes a cost to exceed a predetermined value.

16. The hardware configuration system of claim 10, wherein the plurality of logic circuits is selected from the group consisting of programmable gate arrays (FPGA), and configurable hardware logic (CHL).

17. The hardware configuration system of claim 10 wherein the hardware configuration system is further adapted to:
select a pair of the plurality of logic circuits to achieve a highest frequency of the hardware configuration system.

18. The hardware configuration system of claim 10, wherein at least one of the plurality of latencies is further associated with a count of a plurality of clock signals.

19. A non-transitory computer-readable storage medium comprising instructions which when executed by a computer cause the computer to:
provide a first data representative of a first assignment of a plurality of wires to a plurality of physical connections of a plurality of logic circuits disposed in a hardware system;
calculate a first plurality of latencies associated with the plurality of wires of the first assignment;
provide a second data representative of a second assignment of the plurality of wires to the plurality of physical connections; and
calculate a second plurality of latencies associated with the plurality of wires of the second assignment, wherein a latency associated with at least a first one of the plurality of wires in the second assignment is less than the latency associated with the at least first one of the plurality of wires in the first assignment, and wherein at least one of the physical connections in each of the first and second assignments is configured to multiplex between wires connected thereto.

20. The non-transitory computer-readable storage medium of claim 19, wherein the instructions further cause the computer to:
sort the plurality of wires in accordance with the first plurality of latencies to generate a latency sorted order, wherein the instructions cause the computer to perform the second assignment in accordance with the latency sorted order.

21. The non-transitory computer-readable storage medium of claim 20, wherein the latency sorted order is in an ascending order from a lowest latency being a first latency in the latency sorted order to a highest latency being a last latency in the latency sorted order.

22. The non-transitory computer-readable storage medium of claim 20, wherein the latency sorted order is in a descending order from a highest latency being a first latency in the latency sorted order to a lowest latency being a last latency in the latency sorted order.

23. The non-transitory computer-readable storage medium of claim 20, wherein the instructions further cause the computer to:
assign each one of an unassigned plurality of wires to a different one of a plurality of vacant connections when a number of the unassigned plurality of wires is less than or equal to a number of the plurality of vacant connections.

24. The non-transitory computer-readable storage medium of claim 19, wherein the instructions further cause the computer to:
assign each one of a first subset of the plurality of wires to at least one of the plurality of physical connections until it is determined that further assignment of an additional one of the plurality of wires causes a cost to exceed a predetermined value.

25. The non-transitory computer-readable storage medium of claim 19, wherein the plurality of logic circuits is selected from the group consisting of programmable gate arrays (FPGA), and configurable hardware logic (CHL).

26. The non-transitory computer-readable storage medium of claim 19, wherein the instructions further cause the computer to:
select a pair of the plurality of logic circuits to achieve a highest frequency of the hardware system.

27. The non-transitory computer-readable storage medium of claim 19, wherein at least one of the plurality of latencies is further associated with a count of a plurality of clock signals.

* * * * *

UNITED STATES PATENT AND TRADEMARK OFFICE
CERTIFICATE OF CORRECTION

| | | |
|---|---|---|
| PATENT NO. | : 10,628,625 B2 | Page 1 of 1 |
| APPLICATION NO. | : 15/477390 | |
| DATED | : April 21, 2020 | |
| INVENTOR(S) | : Geist et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 131 days.

Signed and Sealed this
Twenty-fourth Day of January, 2023

Katherine Kelly Vidal
*Director of the United States Patent and Trademark Office*